United States Patent [19]

Tolley et al.

[11] 4,322,390
[45] Mar. 30, 1982

[54] HYDROMETALLURGICAL RECOVERY OF COPPER, COBALT NICKEL WITH REDUCTIVE AND OXIDATIVE LEACHING

[75] Inventors: William K. Tolley, Salt Lake City, Utah; William C. Laughlin, Schaumburg, Ill.

[73] Assignee: UOP Inc., Des Plaines, Ill.

[21] Appl. No.: 200,836

[22] Filed: Oct. 27, 1980

[51] Int. Cl.$^3$ .................................................. C22B 3/00
[52] U.S. Cl. ........................................ 423/27; 423/33; 423/150; 75/101 R; 75/103
[58] Field of Search ........ 423/1, 150, 658.5, DIG. 14, 423/32, 33, 27; 75/101 R, 103, 119

[56] References Cited

U.S. PATENT DOCUMENTS

| | | | |
|---|---|---|---|
| 3,684,491 | 8/1972 | Coffield | 75/103 |
| 3,728,105 | 4/1973 | Skarbo | 423/DIG. 4 |
| 3,888,966 | 6/1975 | Miller | 423/150 |
| 3,891,522 | 6/1975 | McKay | 423/150 |
| 3,967,958 | 6/1976 | Coffield | 423/DIG. 4 |
| 4,065,542 | 12/1977 | Subramanian | 423/150 |
| 4,085,188 | 4/1978 | Subramanian | 423/150 |
| 4,107,262 | 8/1978 | Lueders | 423/150 |
| 4,243,550 | 1/1981 | Burk | 423/150 |

FOREIGN PATENT DOCUMENTS 2448 2/1974 South Africa ................ 423/DIG. 4

OTHER PUBLICATIONS

*The Merck Index*, 8th Ed., Merck & Co., Rahway, N.J., (1968), p. 1040.
Martell, *Chemistry of the Metal Chelate Compounds*, Prentice Hall (1952), pp. 385–387.

*Primary Examiner*—Brian E. Hearn
*Attorney, Agent, or Firm*—James R. Hoatson, Jr.; Raymond H. Nelson; William H. Page, II

[57] ABSTRACT

Desired metal values are recovered from metal-bearing sources by subjecting said metal-bearing sources to a reduction step which is effected in an aqueous solution of an ammoniacal ammonium salt containing a reducing reagent such as hydrazine, hydroxylamine hydrochloride, etc., or by treatment with carbon monoxide in the presence of a metal chelate such as that formed from cobalt sulfate and dimethyl glyoxime, and thereafter subjecting the reduced source to an oxidative leach by treatment wth an oxygen-containing gas such as air or oxygen. The reducing step is effected at ambient temperatures and pressures and the oxidative step is effected at ambient temperatures and pressures ranging from about 5 to about 500 psig. Desired metal values such as nickel and cobalt may be recovered in commercially attractive yields.

8 Claims, No Drawings

HYDROMETALLURGICAL RECOVERY OF COPPER, COBALT NICKEL WITH REDUCTIVE AND OXIDATIVE LEACHING

BACKGROUND OF THE INVENTION

In the processing of materials containing metal values, two of the main extractive methods to be considered are pyrometallurgy and hydrometallurgy. In the former, metal-containing material such as ore, slag, scrap, etc. is heated with appropriate agents such as reducing agents, fluxing agents, sulfidizing agents, chloridizing agents and/or oxidizing agents, etc., usually to the melting or fusion point of the mixture. At this temperature there is generally a separation of metallic values from gangue or waste materials. The procedure then calls for separating the metallic values from slag or waste material at a temperature at which both are molten. The phase containing the metal value is then cast to some convenient shape for use or for further refining, whichever is appropriate for the particular system involved. The very high temperatures involved in this technique are achieved via electric furnaces, blast furnaces, reverberatory furnaces, etc. Temperatures required for metals such as copper, nickel, iron would generally range from 2000° to 3000° F. An advantage in this method is that recoveries of the metal values are typically quite high.

The hydrometallurgy approach differs substantially from pyrometallurgy in that, although the metal bearing material such as ore, slag, scrap, etc. may be heated with agents such as reducing agents, oxidizing agents, sulfidizing and chloridizing agents as part of the procedure, the temperatures involved are generally much lower than with the usual pyrometallurgical method. These temperatures typically may be 500° to 1900° F., temperatures generally well below the fusion point of the metal-containing material.

Following this step, the treated metal-containing material then is contacted with an appropriate aqueous solution for extracting metal values by dissolution. The metal is then removed from the solution by precipitation, solvent extraction, evaporation of solvent, etc. The metal-containing residue obtained is then handled appropriately to further refine the metal. Although conditions of temperature are generally much lower than in pyrometallurgy, it is frequently found that recovery of the metal values is also lower than in the pyrometallurgical method.

A particular case where this is true concerns the extraction of nickel from lateritic nickel ores. The pyrometallurical processes range from the use of an electric furnace for the direct smelting of ore to produce ferronickel through similar techniques involving the blast furnace in which an iron-nickel-sulfide matte is obtained. The extraction of nickel from the ore using this method is greater than 90%.

Of the several hydrometallurgy approaches used commercially for treating this type of ore, the practice on a highly limonitic ore, such as at Nicaro, Cuba, involves roasting the ore in a multihearth furnace while a reducing gas such as producer gas passes countercurrent to the ore. Temperatures in this case range from about 900° to about 1350° F. Following the roasting step, the ore is cooled in the absence of air, mixed with an ammoniacal ammonium carbonate solution and vigorously agitated and aerated. This results in the dissolution of nickel and cobalt, separating them from the bulk of the ore. This solution then is treated with steam, driving off ammonia and precipitating nickel carbonate. This product then is treated further to obtain the appropriate form of nickel or used as such. In comparison to the pyrometallurgical process, however, extractions using this method have only been of the order of 70 to 80%.

Several other hydrometallurgy methods involve the use of procedures which include a roasting step with chlorides or sulfates, but in other than reducing atmospheres, and the roaster ore is leached with an appropriate solvent such as dilute sulfuric acid. Alternatively, in certain cases the ore can be leached directly, such as with sulfuric acid solution, but this is practical only when the magnesia content of the ore is low and when leaching conditions of high temperature, high pressure and high acid concentration are used. As will hereinafter be shown in greater detail, we have now discovered that an effective and economical process for recovering nickel using ambient leaching conditions and dilute acids may be effected by utilizing the process of the present invention.

In processes involving the reductive roast of metal-bearing sources, a major portion of the energy which is required in roasting metal sources such as ores is expended in removing water from the surface and from the lattices of the ore. Inasmuch as energy costs have increased at a tremendous rate during the past few years, thus substantially increasing the overall cost of recovering desired metal values from the metal-bearing source, it is necessary to discover new methods for the recovery of the metal values by utilizing processes which will greatly lessen the enegy cost of the process, and thus lower the overall amount of money which is expended to render the process economically attractive or viable to operate.

As will hereinafter be shown in greater detail, we have now discovered a method for the recovery of metal values from metal-bearing sources without the undesirable consumption of an excess amount of energy.

DETAILED DESCRIPTION OF THE INVENTION

This invention relates to a method for the hydrometallurgical recovery of metal values from a metal-bearing source. More specifically, the invention is concerned with a method for the hydrometallurgical recovery of metal values such as nickel and copper from a metal-bearing source containing a mixture of many metals without the expenditure of an excessive amount of energy.

It is therefore an object of this invention to provide an improved method of hydrometallurgical recovery of metal values from a metal-bearing source.

In one aspect an embodiment of the invention resides in a process for the hydrometallurgical recovery of metal values from a metal-bearing source which comprises treating said metal-bearing sources with an aqueous solution containing a reduction reagent at reduction conditions, thereafter subjecting the resultant reduced metal source to an oxidative leach by treatment with an oxidizing agent at oxidizing conditions and recovering the desired metal values.

A specific embodiment of this invention is in a process for the hydrometallurgical recovery of metal values such as nickel and cobalt from a metal-bearing source such as a laterite ore which comprises treating said ore with an aqueous solution of ammoniacal ammonium carbonate containing hydrazine at ambient temperatures and pressures, thereafter subjecting the resultant reduced ore to an oxidative leach by treating the source with oxygen at ambient temperatures and a pressure in the range of from about 5 to about 500 psig, and recovering the desired nickel and cobalt.

Other objects and embodiments will be found in the following further detailed description of the present invention.

As hereinbefore set forth, the present invention is concerned with a method for the hydrometallurgical recovery of metal values from a metal-bearing source. The term "metal-bearing source" as used in the present specification and asserted claims will refer to sources such as ore, slag, scrap, etc. In the interest of brevity, it is to be understood that reference to ore in the present specification will also include reference to the other metal-bearing sources hereinbefore set forth. The improved process of the present invention for the recovery of a desired metal value is particularly applicable to the recovery of nickel and cobalt from such sources. However, it is to be understood that the process may also be used for the recovery of other metal values including, for example, copper, manganese, etc.

The hydrometallurgical recovery of metal values may be effected by treating a metal-bearing source such as a laterite ore which may be serpentinic, limonitic, etc. in nature to a reducing step which is effected at reducing conditions including ambient temperatures and pressures. The use of ambient temperatures and pressures is of particular importance inasmuch as, in prior processes, roasting was required before an ammoniacal leaching of the ore in order to reduce the valuable metals contained therein to thus make them soluble in an ammoniacal solution. The ammoniacal leaching of the ore in a reduced stage is selective inasmuch as it results in the leaching of only desired metal values such as cobalt, nickel, and copper, while not affecting the undesired metals such as iron and magnesium. Alternatively, according to prior processes, the desired metal values could be obtained by an acid leaching process. However, the disadvantages which are inherent in the acid leaching process are that the leaching is not selective for the valuable metals and, in addition, frequently consumes large amounts of reagents, thus contributing to a more expensive method of recovering desired metal values.

The reduction of the metal-bearing source such as an ore in the present process is effected, in one embodiment of the invention, by treating the source in an aqueous solution which contains a reducing reagent. Accordingly, the metal-bearing source such as an ore is first prepared in a manner suitable for the process whereby the ore is subjected to conventional treatment in order to form finely divided or comminuted particles, said treatment being afforded by grinding or other treatments which are well known in the art. The particles may be within a size range of from about 35 up to about 325 mesh and preferably within a range of from about 50 to about 200 mesh. If so desired, the particles may be dried in a conventional manner by treating the particles in a rotary kiln at conventional temperatures in order to lower th moisture content of said particles of from about the usual 25 to 50 percent down to about 8 to 10 percent or less. Following the drying step, the particles are then treated with an ammoniacal ammonium salt solution which contains a reducing reagent. Examples of reducing reagents which may be employed to reduce the metal values in the metal-bearing source will include compounds such as: thioacetamide, hydrazine, hydroxylamine hydrochloride; organic acids such as formic acid, acetic acid, propionic acid, butyric acid, oxalic acid, malonic acid, succinic acid, etc. It is to be understood that the aforementioned reducing reagents are only representative of the class of compounds which may be employed, and that the process of this invention is not necessarily limited thereto.

Following the reducing step of the process which, as hereinbefore set forth, is effected by ambient temperatures and pressures for a period of time which may range from about 1 to about 20 hours or more in duration, the ammoniacal ammonium salt/ore slurry containing reduced metal values is then subjected to an oxidation step by treatment with an oxidizing agent comprising an oxygen-containing gas such as oxygen, air, etc. to extract the metal values. The oxidative leach of the solution is also effected at ambient temperatures and pressures ranging from about 5 to about 500 lbs. per square inch gauge (psig), also for a period of time which may range from 1 to about 20 hours or more in duration. The desired metal values, after being subjected to the oxidative leach steps of the process, may be separated from any solid gangue and the desired metal values may be recovered from the solution by any known technique. Examples of treatment of the solution containing the desired metal values will include precipitation as the metal, the oxide, the carbonate, or the sulfide, or by cementation, neutralization or by solvent extraction and electrolysis, and by further concentrating the metal values such as the nickel value or copper value to facilitate recovery in a greater yield than would otherwise be effected.

An alternative method of effecting the process of this invention comprises reducing the metal-bearing source utilizing a metal chelate as a reducing reagent. For example, the metal chelate may comprise a cobalt complex in which colbalt is chelated with a complexing agent such as dimethyl glyoxime, colbalt bis salicylaldehydeethylene diimine, cobalt glycylglycine, cobalt histidine, cobalt phthalocyanine, cobalt phthalocyanine monosulfonate, colbalt phthalocyanine disulfonate, cobalt phthalocyanine tetrasulfonate, titanium bis salicylaldehydeethylene diimine, titanium glycylglycine, titanium histidine, titanium phthalocyanine, titanium phthalocyanine monosulfonate, titanium phthalocyanine disulfonate, titanium phthalocyanine tetrasulfonate, etc. It is to be understood that the afore-mentioned complexing agents are only representative of the type of compounds which may be used, and that the present invention is not necessarily limited thereto.

The use of these complexing agents along with carbon monoxide gas will facilitate the reduction of nickel which is present in the metal-bearing source, and thus permit a greater percentage of said nickel to be recovered. This method of effecting the reduction of the metal-bearing source is also effected at ambient temperatures and pressures. Following the reduction of the metal-bearing source, the solution is then subjected to an oxidation step utilizing an oxygen-containing gas of the type hereinbefore set forth, said oxidation being effected at ambient temperatures and an oxygen pressure in the range of from about 5 to about 500 lbs. per square inch for a period of time which may range from about 0.5 up to about 10 hours or more in duration. As in the first discussed process, the desired metal values are thereafter recovered by conventional means of the type previously discussed.

The following examples are presented to illustrate the novelty and utility of the present invention. However it is to be understood that these examples are not intended to unduly limit the scope of the present invention in strict accordance therewith.

EXAMPLE I

In this example, a serpentinic laterite ore from Burundi which contained 1.5% nickel, 0.04% cobalt, and 0.17% copper along with various other metals was utilized as the metal-bearing source. The ore was ground to −100 mesh and 30 grams of the ground ore was treated with 200 ml of a high strength ammonium carbonate solution containing 20 grams of hydroxylamine hydrochloride. The high strength ammonium carbonate solution contained 7.4M ammonia and 2.3M carbonate. The ore was leached for a period of 4 hours. Following this, the solution was subjected to oxidation by treatment with oxygen at a pressure of 5 psig for a period of 3 hours. The solution was assayed for nickel, cobalt and copper contents to determine the percent extraction of the various metals. The assay showed that 42% of the cobalt was extracted, 8.1% of the nickel, and 12% of the copper.

EXAMPLE II

In a manner similar to that set forth in the above example, 30 grams of Burundi ore was reduced by treatment with 150 ml of a high strength ammonium carbonate solution and 50 ml of hydrazine hydrate for a period of 4 hours. At the end of this period, the solution was oxidatively leached with oxygen for a period of 3 hours. An assay of the filtrate determined that there had been a 54% extract of cobalt, 8.7% extraction of nickel, and 6.5% extraction of copper.

EXAMPLE III

To illustrate a varient in the process, 30 grams of Burundi ore was leached in 300 ml of a low strength ammonium chloride solution, said ammonium chloride containing 4M of ammonia and 0.8M of chloride. In addition, the solution also contained a metal chelate which was formed with 15 grams of cobalt sulfate in 2 grams of dimethyl glyoxime. The solution was purged with carbon monoxide for a period of 3 hours. At the end of the 3 hour period, introduction of carbon monoxide into the solution was discontinued and the solution was allowed to stand for a period of 16 hours. Thereafter, the solution was then oxidized by treatment with oxygen at a pressure of 5 psig for a period of 2.5 hours. Analysis of the filtrate disclosed that approximately 79% of the nickel was extracted.

We claim as our invention:

1. A process for the hydrometallurgical recovery of nickel, cobalt or copper metal values from an unreduced metal-bearing source containing said metal values which comprises treating said metal-bearing source with an aqueous solution containing a metal chelate and carbon monoxide at ambient temperatures and pressures, and thereafter subjecting said treated metal-bearing source to an oxidative leach by treatment with an oxidizing agent at oxidizing conditions, and thereafter recovering said nickel, cobalt or copper metal values.

2. The process as set forth in claim 1 in which said oxidation conditions include ambient temperatures and a pressure in the range of from about 5 to about 500 psig.

3. The process as set forth in claim 1 in which said aqueous solution comprises a solution containing an ammoniacal ammonium salt.

4. The process as set forth in claim 3 in which said ammonium salt is ammonium carbonate.

5. The process as set forth in claim 3 in which said ammonium salt is ammonium chloride.

6. The process as set forth in claim 1 in which said metal chelate is a cobalt complex.

7. The process as set forth in claim 1 in which said oxidizing agent comprises oxygen.

8. The process as set forth in claim 1 in which said oxidizing agent comprises air.

* * * * *